United States Patent
Jaiswal et al.

(10) Patent No.: US 12,056,443 B1
(45) Date of Patent: Aug. 6, 2024

(54) APPARATUS AND METHOD FOR GENERATING ANNOTATIONS FOR ELECTRONIC RECORDS

(71) Applicant: nference, Inc., Cambridge, MA (US)

(72) Inventors: Shashank Jaiswal, Pirpainti (IN); Praveen Kumar, Bengaluru (IN); Akash Anand, Bhagalpur (IN); Rakesh Barve, Bengaluru (IN)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/538,705

(22) Filed: Dec. 13, 2023

(51) Int. Cl.
*G06F 40/169* (2020.01)
*G06F 3/04812* (2022.01)
*G06N 3/0455* (2023.01)
*G06N 3/09* (2023.01)

(52) U.S. Cl.
CPC ........ *G06F 40/169* (2020.01); *G06F 3/04812* (2013.01); *G06N 3/0455* (2023.01); *G06N 3/09* (2023.01)

(58) Field of Classification Search
CPC ...... G06N 40/169; G06N 3/09; G06N 3/0455; G06N 3/045; G06N 3/088; G06N 3/047; G06N 20/10; G06F 3/04812; G06F 40/40; G06F 18/2148; G06F 16/211; G06Q 30/0282; G06V 10/7753
See application file for complete search history.

(56) References Cited

U.S. PATENT DOCUMENTS

| | | | |
|---|---|---|---|
| 11,182,697 B1 * | 11/2021 | Murakonda | G06N 20/00 |
| 11,556,610 B2 * | 1/2023 | Samanta | G06V 30/414 |
| 11,556,805 B2 * | 1/2023 | Gu | G16H 10/60 |
| 11,645,449 B1 * | 5/2023 | Ritchie | G06Q 30/0282 |
| | | | 715/230 |
| 11,714,831 B2 * | 8/2023 | Makhija | G06V 30/40 |
| | | | 706/20 |
| 11,797,755 B2 | 10/2023 | Awadalla et al. | |

(Continued)

FOREIGN PATENT DOCUMENTS

| | | | | |
|---|---|---|---|---|
| CA | 3043686 A1 * | 1/2020 | | G01C 19/36 |
| CA | 3131254 A1 * | 10/2020 | | G06N 3/08 |

(Continued)

OTHER PUBLICATIONS

Johann Frei, Frank Kramer; Annotated dataset creation through large language models for non-english medical NLP; Journal of Biomedical Informatics vol. 145, Sep. 2023, 104478.

(Continued)

*Primary Examiner* — Steven P Sax

(74) *Attorney, Agent, or Firm* — Caldwell Intellectual Property Law

(57) ABSTRACT

An apparatus for generating annotations for electronic records is disclosed. The apparatus includes a processor and a memory containing instructions configuring the processor to receive unstructured data for a plurality of electronic records and generate a plurality of machine learning models (MLMs), wherein each MLM of the plurality of MLMs is trained using a machine learning algorithm. The processor is further configured to generate at least one annotation for the unstructured data using each MLM of the plurality of MLM and structure the unstructured data as structured data as a function of the generated annotations.

12 Claims, 8 Drawing Sheets

(56) References Cited

U.S. PATENT DOCUMENTS

| | | | | |
|---|---|---|---|---|
| 2013/0095864 | A1* | 4/2013 | Marovets | G06Q 30/0239 |
| | | | | 455/466 |
| 2020/0175028 | A1* | 6/2020 | Kozlowski | G06F 16/252 |
| 2020/0380311 | A1* | 12/2020 | Lourentzou | G06F 40/169 |
| 2022/0050955 | A1 | 2/2022 | Awadalla et al. | |
| 2023/0059494 | A1* | 2/2023 | Hunter | G06F 40/279 |
| 2023/0316098 | A1* | 10/2023 | Sabapathy | G06N 20/20 |
| | | | | 706/12 |
| 2023/0325715 | A1* | 10/2023 | Sabharwal | G06N 3/0464 |
| | | | | 706/12 |
| 2023/0419121 | A1* | 12/2023 | Poms | G06N 20/00 |
| 2024/0070318 | A1* | 2/2024 | Truong | G06F 21/6245 |

FOREIGN PATENT DOCUMENTS

| | | | | |
|---|---|---|---|---|
| CA | 3163394 | A1 * | 7/2021 | G06F 16/258 |
| CA | 3214007 | A1 * | 6/2022 | G06F 16/211 |
| CA | 3213187 | A1 * | 9/2022 | A23J 1/006 |
| CA | 3188675 | A1 * | 2/2024 | G06N 20/00 |
| CN | 114155402 | A * | 3/2022 | G06F 18/214 |
| CN | 114466954 | A * | 5/2022 | G06K 9/00664 |
| JP | 7409622 | B2 * | 1/2024 | G06F 17/18 |
| KR | 102606732 | B1 * | 11/2023 | |
| WO | WO-2022226231 | A1 * | 10/2022 | |
| WO | WO-2024006188 | A1 * | 1/2024 | G06N 3/0475 |
| WO | WO-2024044011 | A1 * | 2/2024 | G06F 40/169 |

OTHER PUBLICATIONS

X. Yang et al.; A large language model for electronic health records; npj Digital Medicine (2022) 194.

* cited by examiner

APPARATUS AND METHOD FOR GENERATING ANNOTATIONS FOR ELECTRONIC RECORDS

FIELD OF THE INVENTION

The present invention generally relates to the field of artificial intelligence. In particular, the present invention is directed to an apparatus and method for generating annotations for electronic records.

BACKGROUND

It is difficult for machine learning models to effectively be used to perform discriminative tasks without fine-tuning. However, fine tuning the machine learning models requires manually curated annotated data. Producing such manually curated annotated data is a time consuming and expensive process.

SUMMARY OF THE DISCLOSURE

In an aspect, an apparatus for generating annotations for electronic records is disclosed. The apparatus includes processor and a memory communicatively connected to the at least a processor. The memory instructs the processor to receive unstructured data for a plurality of electronic records and generate a plurality of machine learning models (MLMs). Each MLM of the plurality of MLMs is trained using a machine learning training technique. The memory also instructs the processor to generate at least one annotation for the unstructured data using each MLM of the plurality of MLM and structure the unstructured data as structured data as a function of the generated annotations.

In another aspect, a method for generating annotations for electronic records is disclosed. The method comprises receiving, by at least a processor, unstructured data for a plurality of electronic records and generating, by the at least a processor, a plurality of machine learning models (MLMs). Each MLM of the plurality of MLMs is trained using a machine learning training technique. The method further comprises generating, by the at least a processor, at least one annotation as a function of the unstructured data using each MLM of the plurality of MLMs and structuring, by the at least a processor, the unstructured data as structured data as a function of the generated annotations.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating annotations for electronic records. In an embodiment, the apparatus comprises at least a processor and a memory communicatively connected to the at least a processor. The memory instructs the processor to receive unstructured data for a plurality of electronic records, generate a plurality of machine learning models (MLMs), wherein each MLM of the plurality of MLMs is trained using a machine learning training technique, generate at least one annotation as a function of the unstructured data using each MLM of the plurality of MLMs, and structure the unstructured data as structured data as a function of the generated annotations upon identifying an agreement between the plurality of MLMs. Exemplary embodiments illustrating aspects of the present disclosure are described below in the context of several specific examples.

Figure 1:
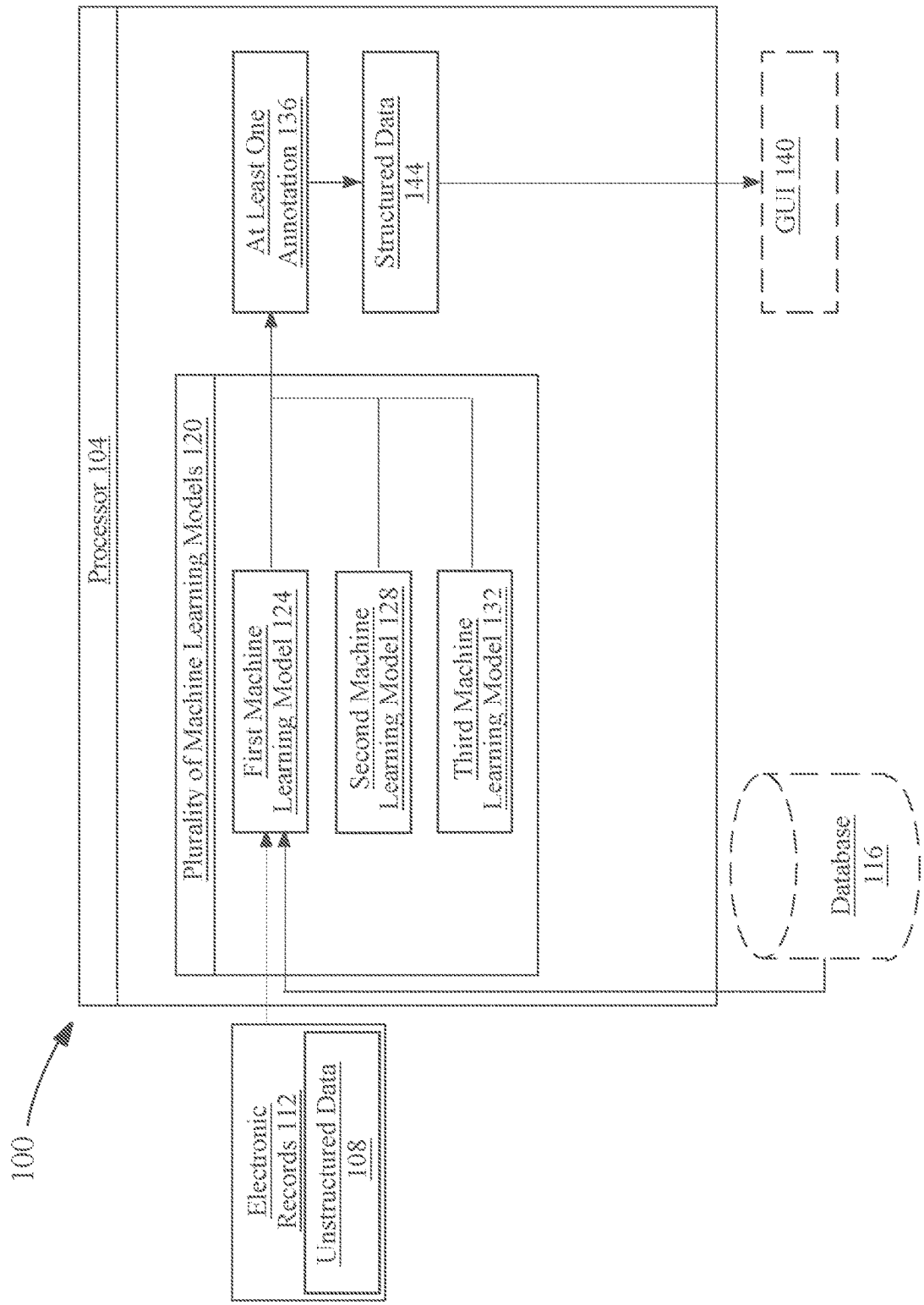
FIG. 1 is a block diagram of an exemplary embodiment of an apparatus for generating annotations for electronic records.

Referring now to FIG. 1, an exemplary embodiment of an apparatus 100 for generating annotations for electronic records is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive unstructured data 108 from a plurality of electronic records 112. As used in the current disclosure, "unstructured data" is any type of information that doesn't have a pre-defined data model or is not organized in a predefined manner. In an exemplary embodiment, unstructured data may be textual data, multimedia content (e.g., audio files, images, and/or videos), electronic messages, and the like. Textual data may include emails, documents, articles, and any other text-based content. In an exemplary embodiment, unstructured data may be unstructured clinical data. As used in this disclosure, "clinical data" is information related to the health and medical history of individuals collected during the course of patient care. This data may be useful for healthcare professionals, researchers, and institutions to make informed decisions about diagnosis, treatment, and patient outcomes. In an exemplary embodiment, unstructured clinical data may include physician's notes, patient histories, diagnostic reports, and other textual data that are not formatted or categorized. As used in this disclosure, an "electronic record" is information that is stored and managed in a digital format. These records can encompass a wide range of content, including text documents, spreadsheets, databases, emails, images, audio files, and more. In an embodiment, electronic record may be an electronic health record. As used in this disclosure, an "electronic health record (EHR)" is a digital collection of health information about individual patients and/or populations. In an embodiment, electronic health records may include medical histories, treatment plans, progress notes, laboratory results, and the like.

With further reference to FIG. 1, processor 104 may be configured to receive unstructured data 108 and/or electronic records 112 from a database 116. Apparatus 100 may be communicatively connected to a database 116. Database 116 may be any database described herein, such as FIG. 3. In an embodiment, any past or present versions of any data disclosed herein may be stored within the database 116 including but not limited to unstructured data 108 and electronic records 112.

Continuing to refer to FIG. 1, in one or more embodiments, processor 104 may be configured to receive unstructured data 108 and/or electronic records 112 from a user input. In one or more embodiments, user input may include interaction of user input device such as uploading an electronic record and the like. In an embodiment, user input device may be any computing device described herein that is communicatively connected to apparatus 100. A "user input device," for the purpose of this disclosure, is any additional computing device, such as a mobile device, laptop, desktop computer, or the like. In an embodiment, user input device may include a wearable device. As used in the current disclosure, a "wearable device" is a computing device that is designed to be worn on a user's body or clothing. In embodiments, a wearable device may include a smart watch, smart ring, fitness tracking device, and the like. The wearable device may detect wearable sensor data. As used in the current disclosure, "wearable sensor data" is data collected by a wearable device. In a non-limiting embodiment, unstructured data 108 may include wearable sensor data. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100 and/or any computing device.

With continued reference to FIG. 1, processor 104 may be configured to receive unstructured data 108 and/or electronic records 112 using an application programming interface (API). As used herein, an "application programming interface" is a set of functions that allow applications to access data and interact with external software components, operating systems, or microdevices, such as another web application or computing device. An API may define the methods and data formats that applications can use to request and exchange information. APIs enable seamless integration and functionality between different systems, applications, or platforms. An API may deliver unstructured data 108 and/or electronic records 112 to apparatus 100 from a system/application that is associated with a user, medical provider, or other third party custodian of user information. An API may be configured to query web applications or other websites to retrieve unstructured data 108 and/or electronic records 112.

With continued reference to FIG. 1, processor 104 may retrieve unstructured data 108 and/or electronic records 112 from one or more sources using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape data associated with the user from user related social media and networking platforms. The web crawler may be seeded and/or trained with a user's social media handles, name, and common platforms a user is active on. The web crawler may be trained with information received from a user through a user interface, described below. Processor 104 may receive information such as a user's name, platform handles, platforms associated with the user and the like, from the user interface. In some embodiments, user database may be populated with data associated with the first user and the second user received from the user interface. A web crawler may be generated by a processor 104. In some embodiments, a web crawler may be configured to generate a web query. A web query may include search criteria. Search criteria may include photos, videos, audio, user account handles, web page addresses and the like received from the user. A web crawler function may be configured to search for and/or detect one or more data patterns. A "data pattern" as used in this disclosure is a matched characteristic of a plurality of information. For example, a data pattern may include, but is not limited to, features, phrases, repeated words, repeated data elements, overlapping classes of data elements, and the like as described further below in this disclosure. The web crawler may work in tandem with any machine-learning model, digital processing technique utilized by processor 104, and the like as described in this disclosure. In some embodiments, a web crawler may be configured to determine the relevancy of a data pattern. Relevancy may be determined by a relevancy score. A relevancy score may be automatically generated by a processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for photographs of the user based on one or more photographs received from entity 132. The web crawler may return data results of photos of the user and the like. In some embodiments, the computing device may determine a relevancy score of each data element retrieved by the web crawler. In one embodiment, at least one user datum 144 is extracted after first information 140 is processed.

Continuing to refer to FIG. 1, processor 104 may extract unstructured data 108 from electronic records 112 or other text received from the user using an optical character recognition system. Optical character recognition or optical character reader (OCR) may be applied upon submission of electronic records 112 into processor 104 and includes automatic conversion of images of written information (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With further reference to FIG. 1, processor 104 is configured to generate a plurality of machine learning models (MLMs) 120. Processor 104 may implement one or more algorithms or generate one or more machine-learning modules. In one or more embodiments, the machine-learning module may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a medical professional, clinic manager, and the like. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. One or more machine-learning modules may be generated using training data. One or more machine-learning modules may be trained by correlated inputs and outputs of training data. Inputs of training data may include a plurality of data sets. Outputs of training data may include conversion, compiling, analyzing, and the like corresponding to the inputs. Training data may be data sets that have already been converted whether manually, by machine, or any other method. Training data may include previous outputs such that one or more machine-learning modules iteratively produce outputs. One or more machine-learning modules using a machine-learning process may output converted data based on input of training data. One or more machine learning modules may be configured to generate a plurality of machine learning models 120, discussed in further detail in FIG. 2. Plurality of machine learning models 120 may be trained by training data, discussed in further detail in FIG. 2. Training data may be stored in database 116, described above.

With continued reference to FIG. 1, processor 104 may be configured to update the training data of plurality of machine learning models 120 using user inputs. Plurality of machine learning models 120 may use user input to update its training data, thereby improving its performance and accuracy. In embodiments, plurality of machine learning models 120 may be iteratively updated using input and output results of past iterations of plurality of machine learning models 120. Plurality of machine learning models 120 may then be iteratively retrained using the updated training data. For instance, and without limitation, plurality of machine learning models 120 may be trained using first training data from, for example, and without limitation, training data from a user input or database. Plurality of machine learning models 120 may then be updated by using previous inputs and outputs from plurality of machine learning models 120 as second training data to then train a second machine learning model. This process of updating plurality of machine learning models 120 and its associated training data may be continuously done to create subsequent plurality of machine learning models 120 to improve the speed and accuracy of plurality of machine learning models 120. When users interact with the software, their actions, preferences, and feedback may be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both plurality of machine learning models 120 or any other machine-learning model and/or classifier discussed herein.

Incorporating the user feedback may include updating the training data by removing or adding correlations of unstructured data to a path or resources as indicated by the feedback. Any machine-learning model as described herein may have the training data updated based on such feedback or data gathered as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

Still referring to FIG. 1, each machine learning model of plurality of machine learning models 120 may include a large language model (LLM). A "large language model," as used herein, is a deep learning algorithm that can recognize, summarize, translate, predict and/or generate text and other content based on knowledge gained from massive datasets. Large language models may be trained on large sets of data; for example, non-user specific training data. Training sets may be drawn from diverse sets of data such as, as non-limiting examples, novels, blog posts, articles, emails, unstructured data 108, electronic records 112, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of LLM may include a plurality of electronic records 112 associated with a plurality of patients. In some embodiments, training sets of LLM may include information from one or more public or private databases. As a non-limiting example, training sets may include databases associated with an entity. In some embodiments, training sets may include portions of documents associated with the electronic records 112 correlated to examples of outputs. In an embodiment, LLM may include one or more architectures for based on capability requirements of LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, LLM may be generally trained. As used in this disclosure, "generally trained" means that LLM is trained on a general training set comprising a variety of subject matters, data sets, and fields. In some embodiments, LLM may be initially generally trained. Additionally, or alternatively, LLM may be specifically trained. As used in this disclosure, "specifically trained" means that LLM is trained on a specific training set, wherein the specific training set includes data including specific correlations for LLM to learn. As a non-limiting example, LLM may be generally trained on a general training set, then specifically trained on a specific training set. In an embodiment, specific training of the LLM may be performed using a supervised machine learning process. In some embodiments, generally training the LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training plurality of machine learning models 120 may include setting the parameters of the model (weights and biases) either randomly or using a pretrained model. Generally training plurality of machine learning models 120 on a large corpus of text data can provide a starting point for fine-tuning on the specific task. The model may learn by adjusting its parameters during the training process to minimize a defined loss function, which measures the difference between predicted outputs and ground truth. Once the model has been generally trained, the model may then be specifically trained to fine-tune the pretrained model on task-specific data to adapt it to the target task. Fine-tuning involves training the model with task-specific training data, adjusting the model's weights to optimize performance for the particular task. In some cases, this may include optimizing the model's performance by fine-tuning hyperparameters such as learning rate, batch size, and regularization. Hyperparameter tuning helps in achieving the best performance and convergence during training. In an embodiment, fine-tuning the pretrained model may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameter that are updated may include parameters that are associated with a specific task or domain.

With continued reference to FIG. 1, LLM, in some embodiments, may include Generative Pretrained Transformer (GPT), GPT-2, GPT-3, GPT-4, and the like. GPT, GPT-2, GPT-3, GPT-3.5, and GPT-4 are products of OpenAI Inc., of San Francisco, CA. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. In another exemplary embodiment, if the words "Her electrocardiogram was normal sinus", the it is highly likely that the word "rhythm" will come next. LLM may output such predictions by ranking words by likelihood or a prompt parameter. For the example given above, the LLM may score "you" as the most likely, "your" as the next most likely, "his" or "her" next, and the like. LLM may include an encoder component and a decoder component.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of the encoder-decoder model. The encoder-decoder model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of positions in a source sentence where the most relevant information is concentrated. LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

With further reference to FIG. 1, decoder may take this output and add it to the decoder inputs. Decoder may continue decoding until a token is predicted. Decoder may stop decoding once it predicts an end token.

Continuing reference to FIG. 1, in some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, LLM may receive an input. Input may include a string of one or more characters. Inputs may additionally include unstructured data 108. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with the electronic records 112.

With continued reference to FIG. 1, LLM may generate at least one annotation as an output. At least one annotation may be any annotation as described herein. In some embodiments, LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

With further reference to FIG. 1, each machine learning model of plurality of machine learning models 120 is trained using a machine learning training technique. As used in this disclosure, "machine learning technique" is a set of algorithms, models, and statistical methods that enable computers to perform a task without explicit programming. In an embodiment, plurality of machine learning models 120 may comprise a first machine learning model 124. First machine learning model 124 may be consistent any machine learning model as described in this disclosure. In an exemplary embodiment, first machine learning model 124 may be a large language model, as described above. In some embodiments, MLMs 120 may include machine-learning models with differing numbers of parameters, such as 7 billion, 13 billion, and the like, as non-limiting examples. In some embodiments, one or more of MLMs 120 may be a decoder-only model. In some embodiments, MLMs 120 may include machine-learning models with differing numbers of parameters, such as 7 to 70 billion parameters. In some embodiments, each MLM of MLMs 120 may include differing architectures. In some embodiments, one or more MLMs 120 may include a transformer architecture. In some embodiments, one or more MLMs 120 may include an autoencoder architecture. In some embodiments, one or more MLMs 120 may include an autoencoder architecture. In some embodiments, one or more MLMs 120 may include a sequence-to-Sequence architecture. In some embodiments, one or more MLMs 120 may include a Recursive Neural Network architecture. In some embodiments, one or more MLMs 120 may include a Hierarchical Model architecture.

With continued reference to FIG. 1, plurality of machine learning models 120 may comprise a second machine learning model 128. Second machine learning model 128 may be consistent any machine learning model as described in this disclosure. In an exemplary embodiment, second machine learning model 128 may be a large language model, as described above.

Continuing to reference to FIG. 1, plurality of machine learning models 120 may comprise a third machine learning model 132. Third machine learning model 132 may be consistent with any machine learning model as described in this disclosure. In an exemplary embodiment, third machine learning model 132 may be a large language model, as described above. Additionally, in a nonlimiting example, first machine learning model 124, second machine learning model 128, and third machine learning model 132 may each be trained using a fine-tuning learning technique. Fine-tuning learning technique may be any fine-tuning learning as described herein.

With further reference to FIG. 1, additionally, or alternatively, machine learning training technique may include a zero-shot learning technique. As used in this disclosure, "zero-shot learning technique" is a technique that is used to train a machine learning model to understand and make predictions about data the machine learning model has not seen during training. For example, first machine learning model 124 may be configured to make predictions about unstructured clinical data that may fall outside of predefined outputs. In an embodiment, zero-shot learning technique may be applied to first machine learning model 124 after first machine learning model is generally trained, as described above. In such an embodiment, first machine learning model 124 is trained on unstructured data, and then first machine learning model 124 is adapted to generate at least one annotation, as described below, which it has seen no labeled examples.

Continuing to refer to FIG. 1, additionally, or alternatively, machine learning training technique may include a few shot learning technique. As used in this disclosure, "few-shot learning technique" is a technique that is used to train a machine learning model to understand and make predictions about data using a limited number of examples. For example, second machine learning model 128 may be configured to make predictions about unstructured clinical data based on a limited amount of training data. In an embodiment, few-shot learning technique may be applied to second machine learning model 128 after second machine learning model 128 is generally trained, as described above. In such an embodiment, second machine learning model 128 is trained on unstructured data, and then second machine learning model 128 is adapted generate at least one annotation, as described below, which it has seen very few labeled examples.

Still referring to FIG. 1, processor 104 is configured to generate at least one annotation 136 for the unstructured data using each MLM of the plurality of MLMs 120. As used in this disclosure, an "annotation" is an informative label, metadata, and the like that is added to unstructured data. Annotation may be used to identify one or more medical terms, conditions, treatments, and other relevant information pertaining to at least one patient within unstructured data. In an embodiment, annotations may include labels and/or tags assigned to specific data. For example, these labels may include information about diseases, conditions, symptoms, treatment modalities, patient demographics, and the like. Additionally, or alternatively, at least one annotation may include metadata. As used in this disclosure, "metadata" is additional information about the characteristics of unstructured data. In an exemplary embodiment, metadata may include timestamps, data source details, measurement units, contextual information, and the like. Further, additionally, or alternatively, annotation may include at least one semantic label. As used in this disclosure, "semantical label" is a label that is used to convey a meaning or significance of the data. Semantic labels may be used to make data more interpretable and facilitate interoperability across healthcare systems. In an exemplary embodiment, semantic label may include attaching diagnostic codes, procedure codes, clinical observations, and the like to patient records.

With further reference to FIG. 1, generate at least one annotation 136 for the unstructured data using each MLM of the plurality of MLMs 120 may include inputting the unstructured data 108 into each machine learning model of the plurality of machine learning models 120 and analyzing the unstructured data 108 using each machine learning model of the plurality of machine learning models 120. In an exemplary embodiment, analyzing the unstructured data 108 may include tokenizing the unstructured data. As used in this disclosure, "tokenizing" is a process of breaking down a body of text into individual units, known as tokens. These tokens can be words, phrases, sentences, or other meaningful elements depending on the level of granularity required and/or desired. Additionally, or alternatively, analyzing the unstructured data 108 using each machine learning model of the plurality of machine learning models 120 may include filtering of stopwords within the unstructured data 108. As used in this disclosure, "stopwords" are words within textual data that do not provide useful information to machine learning models 120 and/or medical professionals. Some exemplary embodiments of stopwords may be "the", "an", "for", and the like. In an exemplary embodiment, analyzing the unstructured data 108 may include atomizing the unstructured data 108. As used in this disclosure, "atomizing" is a process of breaking down a single word of text and/or token into smaller units such as a base or root word. In an exemplary embodiment, unstructured data may include "wave flattening" and atomizing the unstructured data may include atomizing "flattening" into "flatten", "flat", and the like.

With continued reference to FIG. 1, generating at least one annotation 136 for the unstructured data using each MLM of the plurality of MLMs 120 may comprise generate the at least one annotation 136 pertaining to at least one entity within the unstructured data as a function of analyzing the unstructured data and each MLM. As used in this disclosure, "entity" is a patient, user, person, and the like associated with unstructured data 108 in electronic record 112. In an exemplary embodiment, each of first machine learning model 124, second machine learning model 128, and third machine learning model 132 may be configured to each receive and analyze unstructured data 108, as detailed above. Further, each of first machine learning model 124, second machine learning model 128, and third machine learning model 132 may be configured to each generate at least one first annotation, at least one second annotation, and at least one third annotation, respectively. In an embodiment, at least one first annotation, at least one second annotation, and at least one third annotation may be independently generated using each respective machine learning model. In an embodiment, each of first machine learning model 124, second machine learning model 128, and third machine learning model 132 may be configured to each generate at least one first annotation, at least one second annotation, and at least one third annotation simultaneously. As used in this disclosure, "simultaneously" is an occurrence or execution of multiple actions, events, or processes at the same time or concurrently. In another exemplary embodiment each of first machine learning model 124, second machine learning model 128, and third machine learning model 132 may be configured to each generate at least one first annotation, at least one second annotation, and at least one third annotation asynchronously. As used in this disclosure, "asynchronously" is occurrence or execution of actions, events, or processes that are not synchronized or happening at the same time. For example, first machine learning model 124 may be configured to generate at least one first annotation, then second machine learning model 128 may be configured to generate at least one second annotation, and finally third machine learning model 132 may be configured to at least one third annotation. Additionally, or alternatively, each of the first machine learning model 124, second machine learning model 128, and third machine learning model 132 may generate at least one first annotation, at least one second annotation, and at least one third annotation in any order.

Still referring to FIG. 1, additionally, or alternatively, generating at least one annotation 136 for the unstructured data using each MLM of the plurality of MLMs 120 may comprise comparing the at least one annotation generated using each MLM of the plurality of MLMs. In an exemplary embodiment, further the example above, processor 104 may be configured to compare each of at least one first annotation, at least one second annotation, and at least one third annotation generated by each of first machine learning model 124, second machine learning model 128, and third machine learning model 132, respectively. Further, generating at least one annotation 136 for the unstructured data using each MLM of the plurality of MLMs 120 may comprise identifying at least one agreement of the at least one annotation generated using each MLM as a function of comparing the at least one annotation generated using each MLM. In an exemplary embodiment, at least one agreement may comprise at least one common annotation from each of at least one first annotation, at least one second annotation, and at least one third annotation. As used in this disclosure, "common annotation" is an informative label, metadata, and the like that is generated for unstructured data by each machine learning model of the plurality of machine learning models. Additionally, or alternatively, generating at least one annotation 136 for the unstructured data using each MLM of the plurality of MLMs 120 may comprise determining at least one validated annotation from the at least one annotation as a function of the identifying the at least one agreement. In an exemplary embodiment, at least one validated annotation may comprise the at least one common annotation from each of at least one first annotation, at least one second annotation, and at least one third annotation, described above. As used in this disclosure, "validated annotation" is an informative label, metadata, and the like that is generated for unstructured data by each machine learning model of the plurality of machine learning models that suggests multiple machine learning models independently arrived at the same conclusion. In an embodiment, validated annotation may indicate a higher likelihood that each generated at least one annotation is accurate and relevant to unstructured data 108 and/or electronic record 112. Additionally, or alternatively, generating at least one annotation 136 for the unstructured data using each MLM of the plurality of MLMs 120 may comprise generating the at least one annotation 136 as a function of the at least one validated annotation. For example, the at least one validated annotation may be at least one annotation 136 generated and added to unstructured data 108 and/or electronic record 112.

With continued reference to FIG. 1, processor 104 may be configured to determine a validated annotation as a function of a voting mechanism. As used in this disclosure, "voting mechanism" is a process or system designed to collect and aggregate information regarding at least one annotation generated by each of first machine learning model 124, second machine learning model 128, and third machine learning model 132. In an embodiment, processor 104 may be configured to determine a validated annotation as a function of a majority voting mechanism. As used in this disclosure, "majority voting mechanism" is a voting process or system where a determination is based on at least one annotation receiving validation based on a majority of machine learning models. For example, processor 104 may be configured to determine a validated annotation when a majority of first machine learning model 124, second machine learning model 128, and third machine learning model 132 agree on at least one common annotation from each of at least one first annotation, at least one second annotation, and at least one third annotation. For example, a validated annotation may be determined when a common annotation is determined from two of at least one first annotation, at least one second annotation, and at least one third annotation.

Further referencing FIG. 1, additionally, or alternatively, generating at least one annotation 136 for the unstructured data using each MLM of the plurality of MLMs 120 may comprise identifying at least one disagreement of the at least one annotation generated using each machine learning model as a function of comparing the at least one annotation generated using each machine learning model. In an exemplary embodiment, at least one disagreement may comprise at least one dissimilar annotation from each of at least one first annotation, at least one second annotation, and at least one third annotation. As used in this disclosure, "dissimilar annotation" is an informative label, metadata, and the like that is not generated for unstructured data by each machine learning model of the plurality of machine learning models. For example, dissimilar annotation may include at least one annotation that is generated by only a single machine learning model from first machine learning model 124, second machine learning model 128, and third machine learning model 132. Further, dissimilar annotation may include at least one annotation that is generated by only two machine learning models from first machine learning model 124, second machine learning model 128, and third machine learning model 132. Additionally, or alternatively, generating at least one annotation 136 for the unstructured data using each MLM of the plurality of MLMs 120 may comprise determining at least one inconclusive annotation from the at least one annotation as a function of the identifying the at least one disagreement. In an exemplary embodiment, at least one inconclusive annotation may comprise the at least one common annotation from only a subset of at least one first annotation, at least one second annotation, and at least one third annotation, described above. As used "inconclusive annotation" is an informative label, metadata, and the like that is generated from unstructured data by each machine learning model of the plurality of machine learning models that suggests multiple machine learning models independently did not all arrive at the same conclusion. In an embodiment, validated annotation may indicate a higher likelihood that each generated at least one annotation may not be accurate and/or relevant to unstructured data 108 and/or electronic record 112. Additionally, or alternatively, generating at least one annotation 136 for the unstructured data using each MLM of the plurality of MLMs 120 may comprise filtering at least one inconclusive annotation from the at least one annotation 136 as a function of the identifying the at least one disagreement. For example, inconclusive annotations may be removed from the at least one annotation 136, unstructured data 108, and electronic record 112. In an embodiment, once inconclusive annotation are filtered out, remaining at least one annotation may be combined with seed data to update training data and train plurality of discriminative BERT based models, as described herein.

Continuing to refer to FIG. 1, additionally, or alternatively, generating at least one annotation 136 for the unstructured data using each MLM of the plurality of MLMs 120 may comprise requesting a user input for the at least one inconclusive annotation from a user such as a domain expert as a function of the filtering the at least one inconclusive annotation. In an exemplary embodiment, processor 104 may be connected to a user interface 140 configured to display any information from apparatus 100 and/or any computing device. A "user interface," as used in this disclosure, is a means by which the user and a computer system interact, including the use of input devices and software. A user interface may include a graphical user interface (GUI), command line interface (CLI), menu-driven user interface, touch user interface, voice user interface (VUI), form-based user interface, and the like. In an embodiment, user interface 140 may comprise a speaker and/or microphone. In an embodiment, user interface 140 may include a display (such as a light emitting diode (LED) display, liquid crystal, quantum dot LED (QLED), organic LED (OLED), active-matrix organic LED (AMOLED), Super AMOLED, and the like), touch screen, or digital writing device. User interface 140 may comprise one or more means for receiving user input such as a keypad, keyboard, mouse, button, touch-screen, touchpad, knob, dial, slider, switch, or the like. User interface 140 may comprise one or more means for providing output such as a display, screen, speaker, vibrating motor (such as the type for vibrating smartphones), LED, light, buzzer, alarm, or the like. As used in the current disclosure, a "graphical user interface" may include a plurality of lines, images, symbols. GUI may be displayed on a display device. Display device may include, but is not limited to, a smartphone, tablet, laptop, monitor, tablet, and the like. Display device may include a separate device that includes a transparent screen configured to display computer generated images and/or information. A domain expert may view the information displayed on the display device in real time. As used in this disclosure, "domain expert" is an individual who is trained and qualified to provide medical care and services to patients. For example, domain experts may include physicians, nurses, pharmacists, medical laboratory professionals, and the like. User interface 140 may be configured to request and receive user input from domain experts. A "user input" as used in this disclosure is information received from an individual. User input may include, for instance and without limitation, information entered via text fields, information entered via clicking on icons of a graphical user interface (GUI), information entered via touch input received through one or more touch screens, and the like. In an exemplary embodiment, user input may include feedback regarding accuracy and/or relevance the at least one inconclusive annotation. User input may include an acceptance and/or rejection of the at least one inconclusive annotation. Additionally, or alternatively, user input may include a modification to the at least one inconclusive annotation. In such an embodiment, processor 104 may be configured to modify the at least one inconclusive annotation as a function of the user input. Modification may be a change to the at least one inconclusive annotation to increase accuracy and/or relevance of the at least one inconclusive annotation. Further, additionally, or alternatively, user input may include manual labeling of unstructured data 108 and/or electronic record 112 associated with at least one inconclusive annotation.

With further reference to FIG. 1, processor 104 is configured to structure the unstructured data 108 as structured data 144 as a function of the generated annotations 136. For example, unstructured data 108 may be categorized and/or organized using the generated annotations 136. In an embodiment, structuring the unstructured data 108 as structured data 144 may comprise structuring the unstructured data 108 as structured data 144 as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as structure training data. In an embodiment, the structure training data may include a plurality of annotation data that are each correlated to one of a plurality of structure data. As used in this disclosure, "structure data" is data associating historical structure and/or associations with different pieces of annotation data. For example, structure training data may be determined historical annotation data that is correlated to structure such as a data cluster such as cluster associated patient symptoms, diagnoses, medications, or the like. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In an embodiment, processor 104 may employ fuzzy logic to categorize and/or organize unstructured data using the generated annotations 136 by allowing values to belong to a range of possible memberships, indicating the degree to which an annotation belongs to a particular category.

Further referring to FIG. 1, processor 104 may be configured to store unstructured data 108, electronic records 112, at least one annotation 136, and structured data 144 may be stored within a second database. Additionally, or alternatively, processor 104 may be configured to store unstructured data 108, electronic records 112, at least one annotation 136, and structured data 144 in database 116. Unstructured data 108, electronic records 112, at least one annotation 136, and structured data 144 may be stored in second database such that second database may be configured to allow efficient retrieval and analysis of the structured clinical data for further additional purposes. For example, structured clinical data may be used for research and analytics purposes, patient care and treatment, and the like.

Still referring to FIG. 1, processor 104 may be configured to train a discriminative model using the structured clinical data. As used in this disclosure, "discriminative model" is type of model that focuses on modeling the decision boundary between different classes or categories. Discriminative models may be configured to directly learn mapping from input features to the output labels and capture the conditional probability distribution of the labels given input data. In an embodiment, discriminative model may be a plurality of discriminative Bidirectional Encoder Representations from Transformers (BERT) based models. As used in this disclosure, "discriminative BERT models" are variations of a pre-trained transformer-based language model configured to learn contextualized word representations by considering the entire context of a word within a sentence bidirectionally. Plurality of discriminative BERT based models may be configured to be fine-tuned for tasks like text classification, named entity recognition, sentiment analysis, and the like.

With continued reference to FIG. 1, plurality of discriminative BERT based models may comprise a named entity recognition (NER) model. As used in the current disclosure, a "named entity recognition (NER) model" is a model that identifies a plurality of named entities within textual data. A NER model may be configured to identify a plurality of named entities from electronic records 112. Inputs of a NER model may include unstructured data 108, electronic records 112, and the like. The output of a named entity recognition model may include a plurality of named entities associated with diagnostic procedures, normal findings, values, and the like.

With continued reference to FIG. 1, a NER system may generate a plurality of named entities using a natural language processing model. As used in the current disclosure, a "natural language processing (NLP) model" is a computational model designed to process and understand human language. It leverages techniques from machine learning, linguistics, and computer science to enable computers to comprehend, interpret, and generate natural language text. The NLP model may preprocess the textual data, wherein the input text may include all text contained within unstructured data 108 and electronic record 112, or any other data mentioned herein. Preprocessing the input text may involve tasks like tokenization (splitting text into individual words or sub-word units), normalizing the text (lowercasing, removing punctuation, etc.), and encoding the text into a numerical representation suitable for the model. The NLP model may include transformer architecture, wherein the transformers are deep learning models that employ attention mechanisms to capture the relationships between words or sub-word units in a text sequence. They consist of multiple layers of self-attention and feed-forward neural networks. The NLP model may weigh the importance of different words or sub-word units within a text sequence while considering the context. It enables the model to capture dependencies and relationships between words, considering both local and global contexts. This process may be used to identify a plurality of named entities. Language processing model may include a program automatically generated by processor 104 and/or named entity recognition model to produce associations between one or more significant terms extracted from unstructured data 108 and electronic record 112 and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in unstructured data 108 and electronic record 112 constitutes a positive or negative indicator may be determined, in an embodiment, by mathematical associations between detected significant terms, comparisons to phrases and/or words indicating positive and/or negative indicators that are stored in memory at processor 104, or the like.

With further reference to FIG. 1, plurality of discriminative BERT based models may comprise an association recognition model. As used in the current disclosure, an "association recognition model" is a model configured to recognize specific patterns or structures commonly associated with each other. Processor 104 may be configured to define one or more patterns within unstructured data and/or electronic records. These patterns can be based on regular expressions or specific rules that describe the format of each event/entity. In an non-limiting example, a pattern for recognizing association between entities in textual data may include identifying a medication, a medication value, a medication unit, and a medication frequency. For example, input textual data may include "Discharge Medications: Aspirin 325 mg q.d.", and association recognition model may be configured to determine that Aspirin, which is a medication, is associated with 325, which is a medication value, is associated with mg, which is a medication unit, is associated with q.d., which is a medication frequency.

Further referencing FIG. 1, plurality of discriminative BERT based models may comprise a certainty assessment model. As used in the current disclosure, a "certainty assessment model" is a model configured to predict a certainty aspect associated with an entity or event. Processor 104 may be configured to predict a certainty aspect associated with an entity or event within unstructured data and/or electronic records. For example, input textual data may include "The patient has a positive diagnosis for colon cancer", and an NER model, such as NER model described above, may extract "colon cancer" as an event. Further, certainty assessment model may be configured to predict "yes" for the event based on the input data. In a further example, input textual data may include "The patient has a negative diagnosis for colon cancer", and an NER model, such as NER model described above, may extract "colon cancer" as an event. Further, certainty assessment model may be configured to predict "no" for the event based on the input data.

Still referring to FIG. 1, plurality of discriminative BERT based models may comprise a temporal assessment model. As used in the current disclosure, a "temporal assessment model" is a model configured to assess a temporal aspect associated with an entity or event. Processor 104 may be configured to determine whether an event occurred in the past, present, or has potential to occur in the future. In a further example, input textual data may include "Mariah Hills, who has a long history of chronic kidney disease, has been brought to the hospital for her heart failure", and an NER model, such as NER model described above, may extract "chronic kidney disease" and "heart failure" as events. Further, temporal assessment model may be configured to predict "HISTORY" for "chronic kidney disease" and "CURRENT" for "heart failure".

Still referring to FIG. 1, plurality of discriminative BERT based models may comprise a subject assessment model. As used in the current disclosure, a "subject assessment model" is a model configured to assess which subject an entity or event is associated with. Processor 104 may be configured to determine whether an event is associated with a first subject, second subject, and the like. In an example, input textual data may include "Patient was diagnosed with adenocarcinoma 12 years ago. The Patient's grandfather died because of heart failure", and an NER model, such as NER model described above, may extract "adenocarcinoma" and "heart failure" as events. Further, subject assessment model may be configured to associate "adenocarcinoma" with patient and "heart failure" for would be associated with Patient's Grandfather and not be associated with patient.

Figure 2:
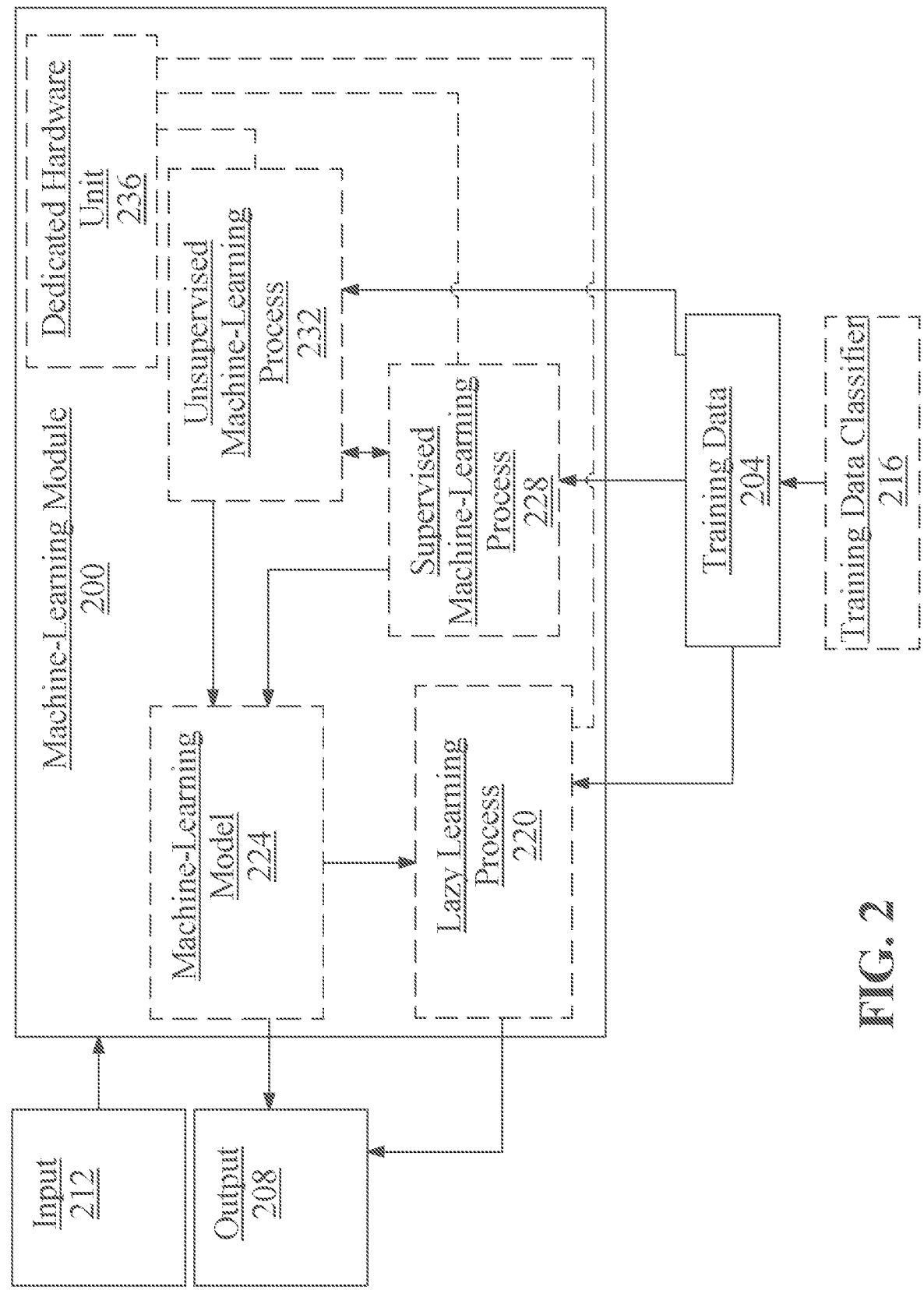
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example unstructured data as inputs correlated to at least one annotation as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to unstructured data to a class of patients such a client demographics.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 136. Processor may interpolate the low pixel count image to convert the 100 pixels into 136 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 136. Processor may downsample the high pixel count image to convert the 256 pixels into 136 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include unstructured data inputs as described above as inputs, at least one annotation as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods.

Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
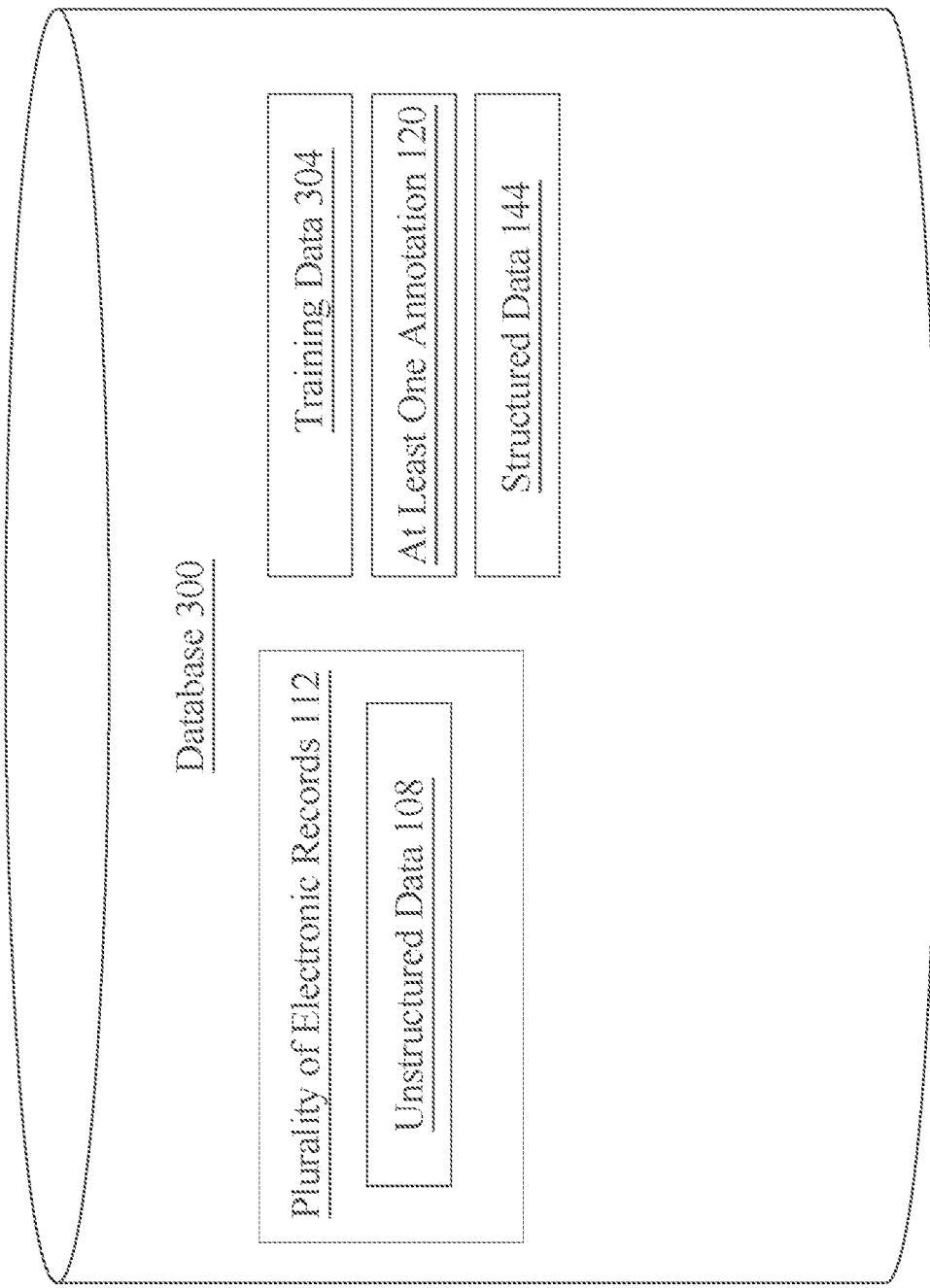
FIG. 3 is a block diagram of an exemplary embodiment of a database.

Now referring to FIG. 3, an exemplary database 300 is illustrated by way of block diagram. In an embodiment, any past or present versions of any data disclosed herein may be stored within the physiological indicator database 300 including but not limited to: unstructured data 108, electronic records 112, at least one annotation 136, structured data 144, training data 304, and the like. Processor 104 may be communicatively connected with database 300. Training data may include any training data described herein. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which processor 104 connects directly, dynamically, and non-hierarchically to as many other computing devices as possible. A "network topology" as used in this disclosure is an arrangement of elements of a communication network. Database 300 may be implemented, without limitation, as a relational database, a key-value retrieval database such as a NOSQL database, or any other format or structure for use as a database that a person skilled in the art would recognize as suitable upon review of the entirety of this disclosure. Database 300 may alternatively or additionally be implemented using a distributed data storage protocol and/or data structure, such as a distributed hash table or the like. Database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
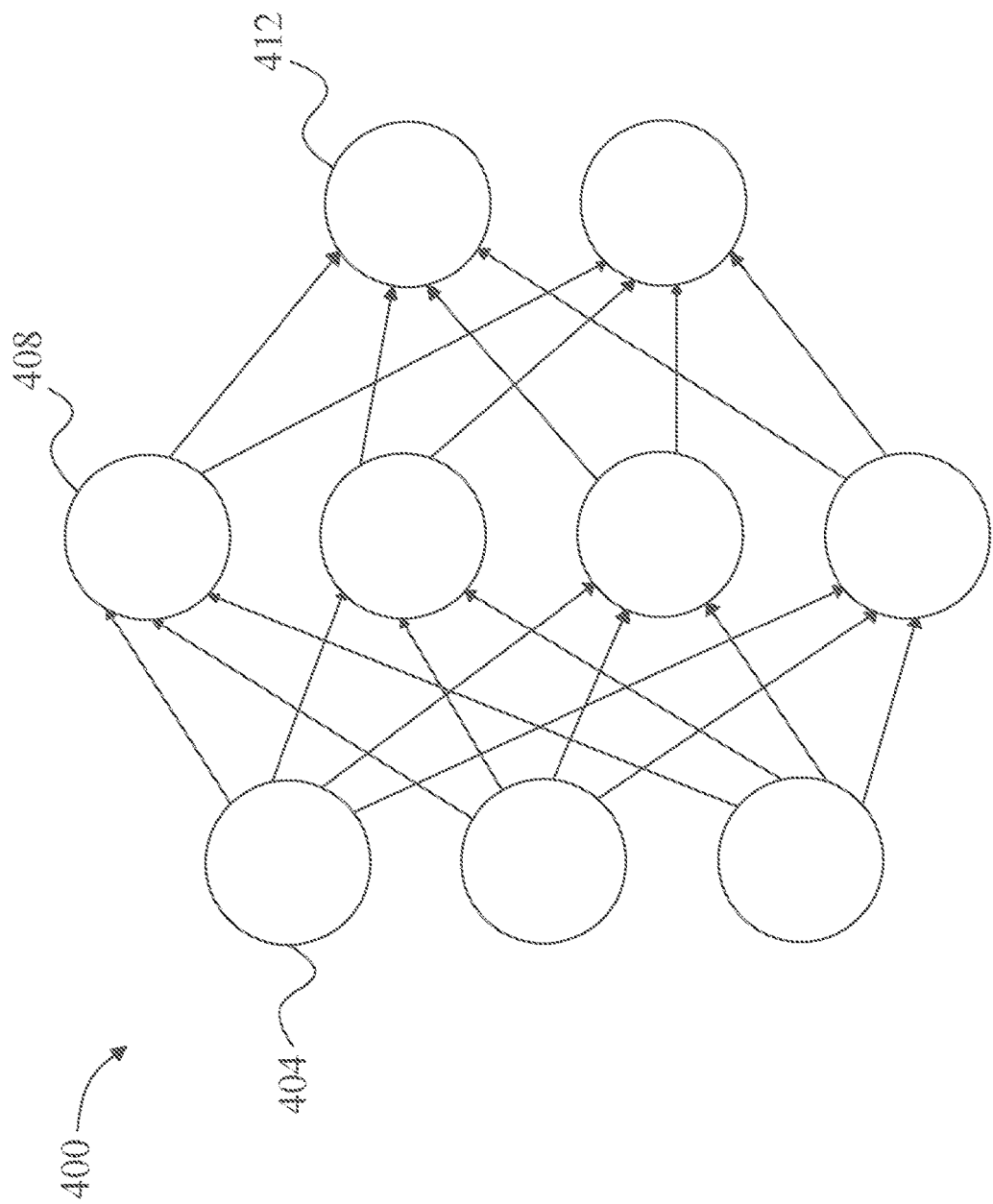
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
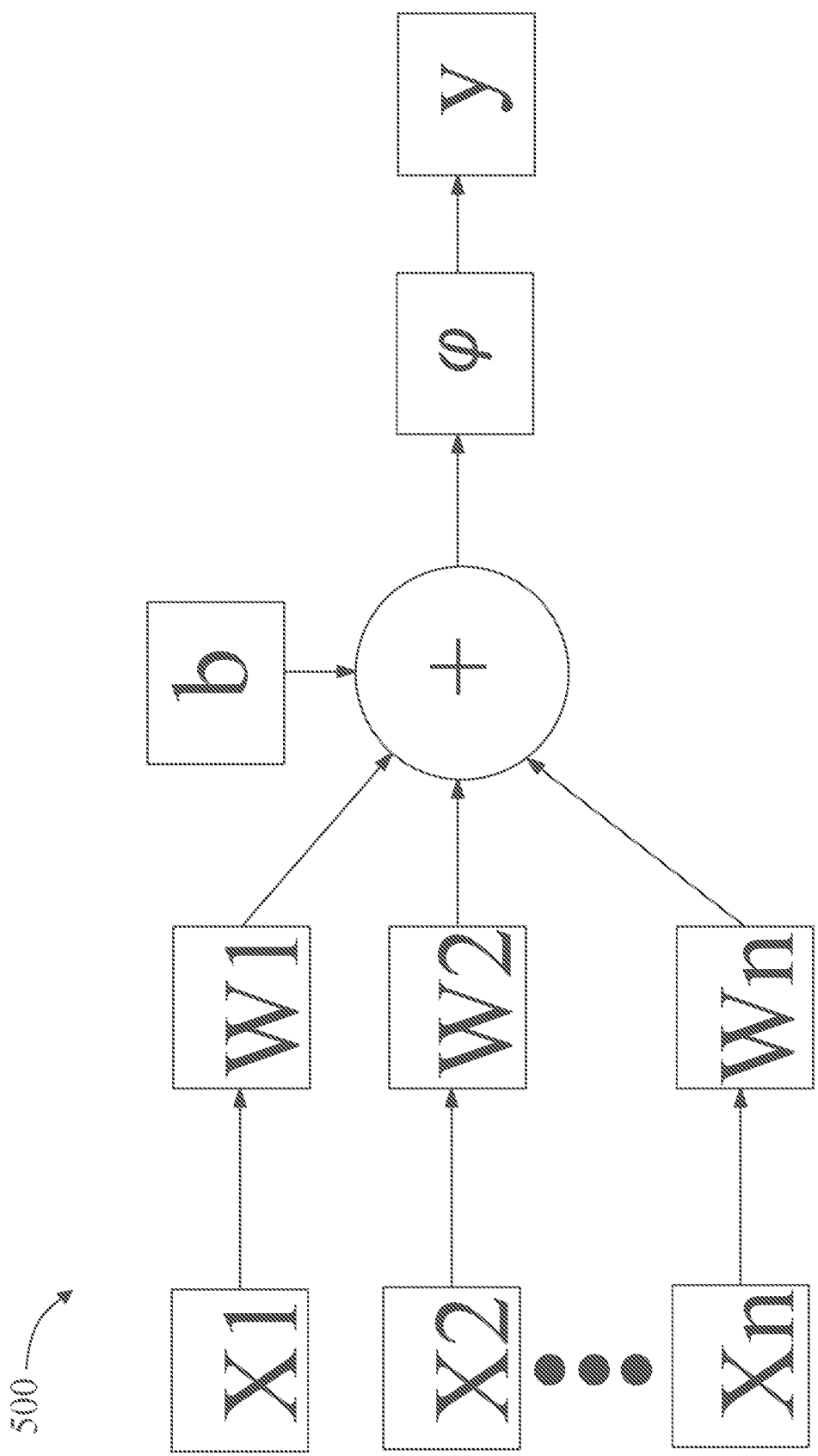
FIG. 5 is a diagram of an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as f (x)=tanh$^2$(x), a rectified linear unit function such as f (x)=max (0, x), a "leaky" and/or "parametric" rectified linear unit function such as f (x)=max (ax, x) for some α, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\Sigma_i x_i}$$

where the inputs to an instant layer are $x_i$, a swish function such as f (x)=x*sigmoid(x), a Gaussian error linear unit function such as f(x)=α(1+tanh ($\sqrt{2/\pi}$(x+bx$^r$))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$, applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
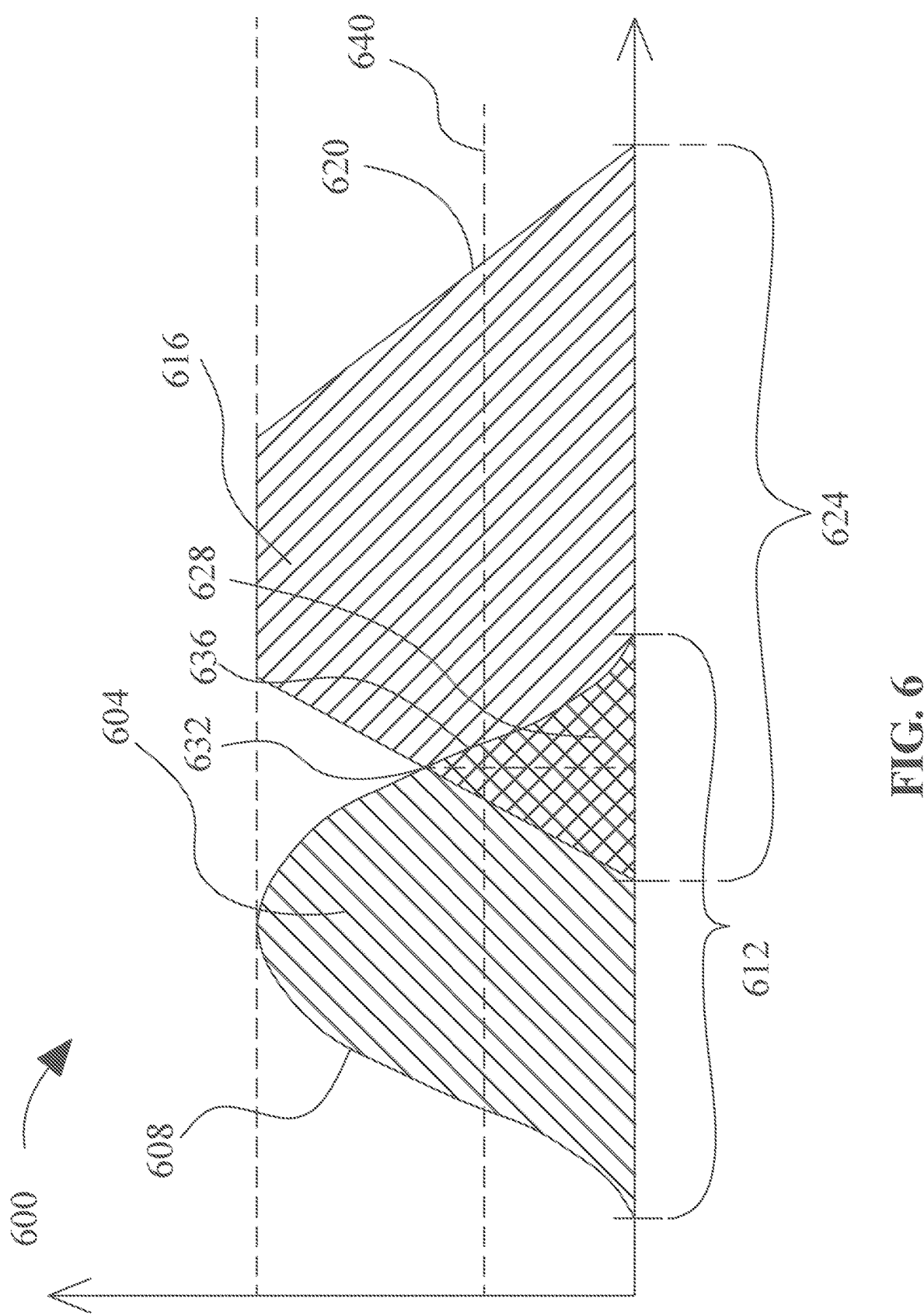
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. For example and without limitation, the parameters, weights, and/or coefficients of the membership functions may be tuned using any machine-learning methods as described herein. In another non-limiting embodiment, the fuzzy set may represent at least one annotation 136 and data cluster such as cluster associated patient symptoms, diagnoses, medications, or the like from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to compare annotations to identify agreement/disagreement wherein the agreement or disagreement between annotations is not clear-cut but rather a matter of degree. Fuzzy logic defines similarity measures between annotations generated by different MLMs. Each annotation can be represented as a fuzzy set where element (e.g., tags) have degrees of membership indicating relevance or importance in the annotations. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input of at least one annotation 136. For instance, an acceptance variable may represent a first measurable value pertaining to the classification of at least one annotation 136 to a data cluster such as cluster associated patient symptoms, diagnoses, medications, or the like. Continuing the example, an output variable may represent a data cluster such as cluster associated patient symptoms, diagnoses, medications, or the like associated with the user. In an embodiment, at least one annotation 136 and/or data clusters such as clusters associated patient symptoms, diagnoses, medications, or the like may be represented by their own fuzzy set. In other embodiments, the classification of the data into a data cluster such as cluster associated patient symptoms, diagnoses, medications, or the like may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, 1(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any at least one annotation 136 and a data cluster such as cluster associated patient symptoms, diagnoses, medications, or the like. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing each of at least one annotation to identify an agreement/disagreement wherein the agreement or disagreement between annotations is not clear-cut but rather a matter of degree as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both at least one annotation 136 and data clusters such as cluster associated patient symptoms, diagnoses, medications, or the like have fuzzy sets, at least one annotation 136 may be classified to a data cluster such as cluster associated patient symptoms, diagnoses, medications, or the like by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
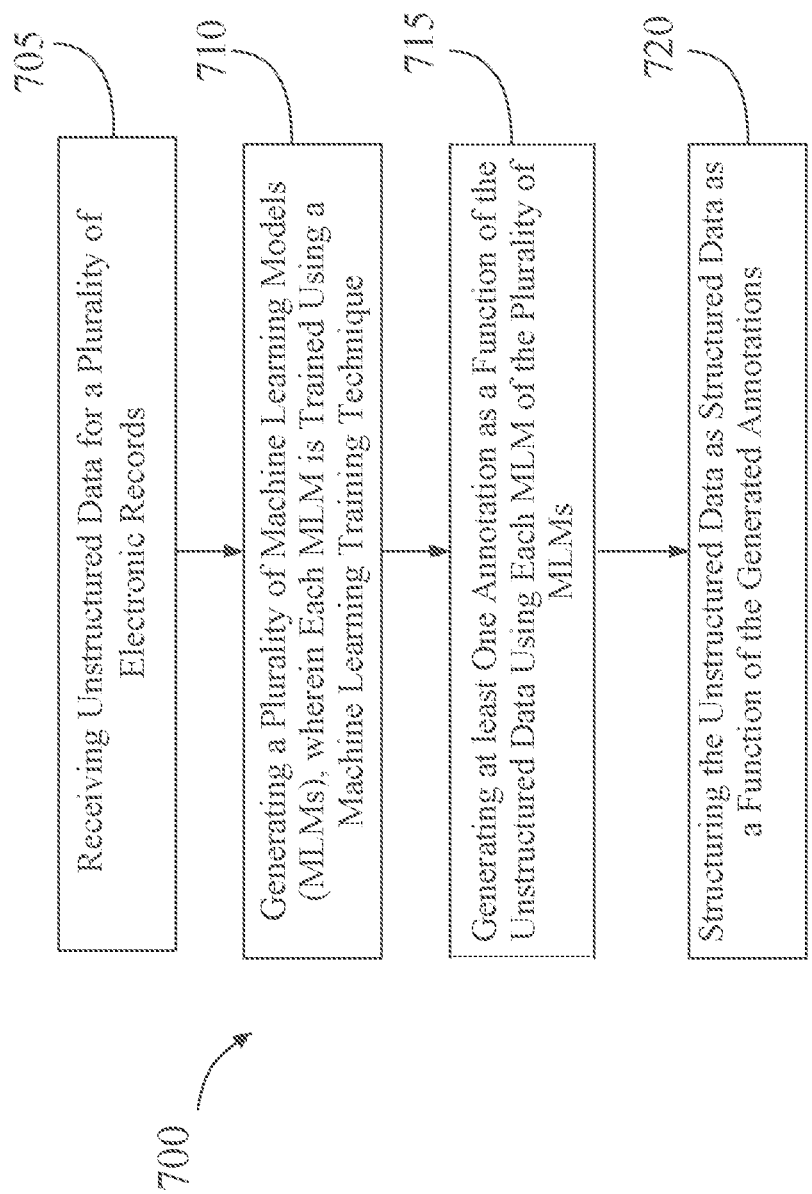
FIG. 7 is a flow diagram of an exemplary method for generating annotations for electronic records.

Referring now to FIG. 7, a flow diagram of an exemplary method 700 for generating annotations for electronic records is illustrated. At step 705, method 700 includes receiving, by at least a processor, unstructured data for a plurality of electronic records. This may be implemented as described and with reference to FIGS. 1-6. In an embodiment, the method may include receiving a plurality electrocardiogram signals from a plurality of sensors.

Still referring to FIG. 7, at step 710, method 700 includes generating, by the at least a processor, a plurality of large language models (MLMs), wherein each MLM of the plurality of MLMs is trained using a machine learning training technique. Additionally, or alternatively, the plurality of MLMs may each be trained using a fine-tuning learning technique. These may be implemented as described and with reference to FIGS. 1-6.

Still referring to FIG. 7, at step 715, method 700 may include generating, by the at least a processor, at least one annotation as a function of the unstructured data using each MLM of the plurality of MLMs. In an embodiment, generating, by the at least a processor, at least one annotation as a function of the unstructured data using each MLM of the plurality of MLMs may comprise inputting, by the at least a processor, the unstructured data into each MLM of the plurality of MLMs; and generating, by the at least a processor, the at least one annotation pertaining to at least one entity within the unstructured data as a function of each MLM. Additionally, or alternatively, generating, by the at least a processor, at least one annotation as a function of the unstructured data using each MLM of the plurality of MLMs may comprise comparing, by the at least a processor, the at least one annotation generated using each MLM of the plurality of MLMs, identifying, by the at least a processor, at least one agreement of the at least one annotation generated using each MLM as a function of comparing the at least one annotation generated using each MLM, determining, by the at least a processor, at least one validated annotation from the at least one annotation as a function of the identifying the at least one agreement, and generating, by the at least a processor, the at least one annotation as a function of the at least one validated annotation. Further, generating, by the at least a processor, at least one annotation as a function of the unstructured data using each MLM of the plurality of MLMs may comprise identifying, by the at least a processor, at least one disagreement of the at least one annotation generated using each MLM as a function of comparing the at least one annotation generated using each MLM, and filtering, by the at least a processor, at least one inconclusive annotation from the at least one annotation as a function of the identifying the at least one disagreement. Furthermore, generating, by the at least a processor, at least one annotation as a function of the unstructured data using each MLM of the plurality of MLMs may comprise requesting, by the at least a processor, a user input for the at least one inconclusive annotation from a domain expert as a function of the filtering the at least one inconclusive annotation. These may be implemented as described and with reference to FIGS. 1-6.

Still referring to FIG. 7, at step 720, method 700 may include structuring, by the at least a processor, the unstructured data as structured data as a function of the generated annotations. This may be implemented as described and with reference to FIGS. 1-6.

Still referring to FIG. 7, method 700 may include training, by the at least a processor, a discriminative model using the structured data. This may be implemented as described and with reference to FIGS. 1-6. In an embodiment, the method may include storing, by the at least a processor, the structured data in a database, wherein the database is configured to allow efficient retrieval and analysis of the structured data. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
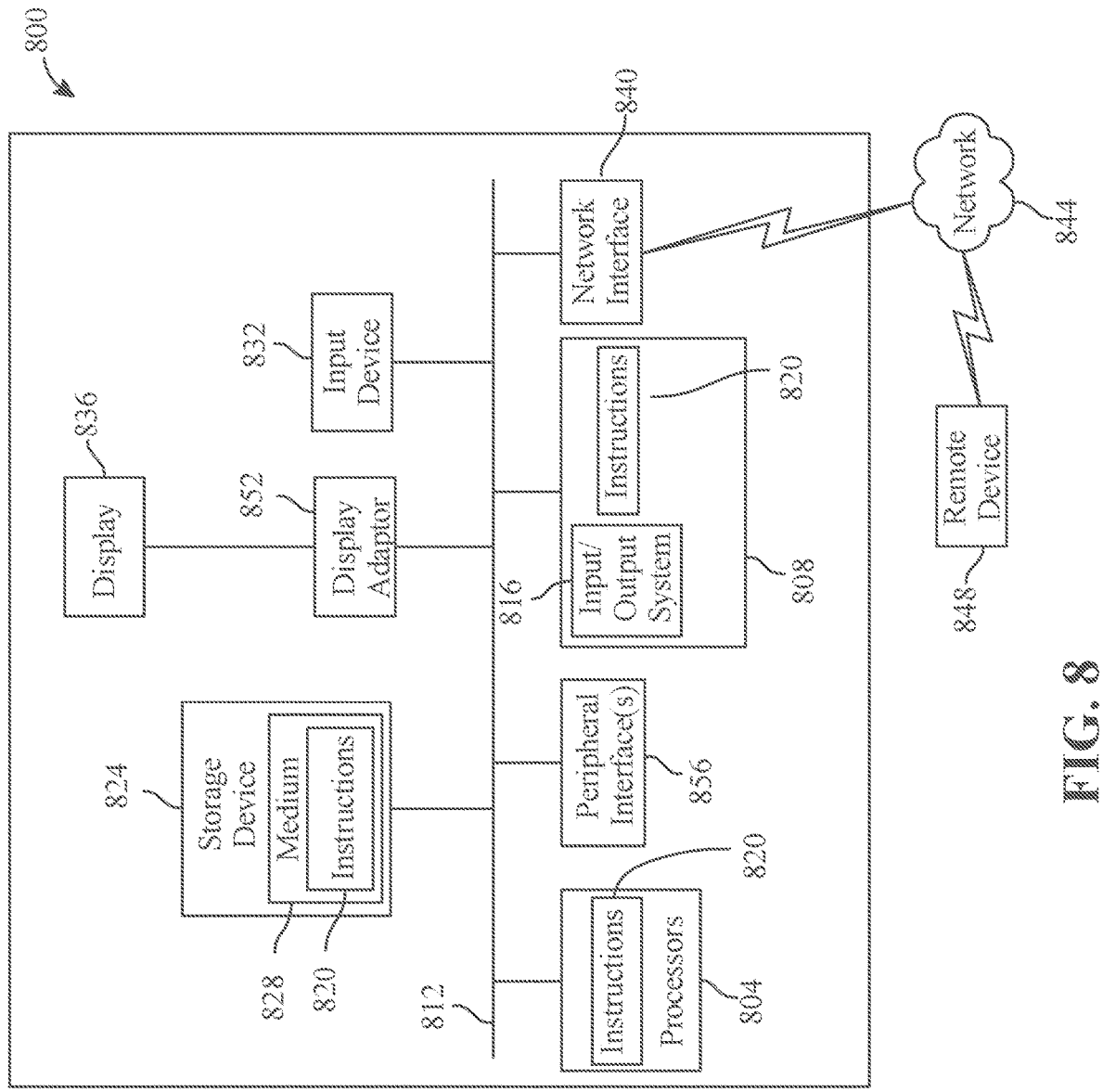
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating annotations for electronic records, wherein the apparatus comprises: at least a processor; and a memory communicatively connected to the at least a processor, wherein the memory contains instructions configuring the at least a processor to:
   receive unstructured data for a plurality of electronic records;
   generate a plurality of machine learning models (MLMs), wherein each MLM of the plurality of MLMs is trained using a machine learning training technique;
   generate at least one annotation for the unstructured data using each MLM of the plurality of MLMs;
   and structure the unstructured data as structured data as a function of the generated annotations;
   wherein generating the at least one annotation as a function of the unstructured data using each MLM of the plurality of MLMs comprises:
      inputting the unstructured data into each MLM of the plurality of MLMs; and
      generating the at least one annotation pertaining to at least one entity within the unstructured data as a function of each MLM;
   wherein generating the at least one annotation as a function of the unstructured data using each MLM of the plurality of MLMs further comprises:
      comparing the annotations generated using the plurality of MLMs;
      identifying at least one agreement between the plurality of MLMs as a function of the comparison of the annotations;
      determining at least one validated annotation from the annotation based on the at least one agreement; and
      generating the at least one annotation as a function of the at least one validated annotation;
   wherein generating the at least one annotation comprises:
      identifying at least one disagreement between the plurality of MLMs as a function of the comparison of the annotations; and
      filtering at least one inconclusive annotation from the annotations based on the at least one disagreement;
   wherein generating the at least one annotation further comprises:
      requesting a user input on a user interface displayed on a physical display for the at least one inconclusive annotation from a user; and
      modifying the at least one inconclusive annotation as a function of the user input.

2. The apparatus of claim 1, wherein the plurality of MLMs comprises a first MLM, a second MLM, and a third MLM.

3. The apparatus of claim 1, wherein the plurality of MLMs are each trained using a fine-tuning learning technique.

4. The apparatus of claim 1, wherein determining the at least one validated annotation from the annotation comprises determining the at least one validated annotation as a function of a voting mechanism.

5. The apparatus of claim 1, wherein the memory further contains instructions configuring the at least a processor to train a discriminative model using the structured data.

6. The apparatus of claim 1, wherein the memory further contains instructions configuring the at least a processor to store the structured data in a database.

7. A method for generating annotations for electronic records, the method comprising: receiving, by at least a processor, unstructured data for a plurality of electronic records; generating, by the at least a processor, a plurality of machine learning models (MLMs), wherein each MLM of the plurality of MLMs is trained using a machine learning training technique; generating, by the at least a processor, at least one annotation as a function of the unstructured data using each MLM of the plurality of MLMs; and structuring, by the at least a processor, the unstructured data as structured data as a function of the generated annotations;
   wherein generating the at least one annotation as a function of the unstructured data using each MLM of the plurality of MLMs comprises:
      inputting, by the at least a processor, the unstructured data into each MLM of the plurality of MLMs; and
      generating, by the at least a processor, the at least one annotation pertaining to at least one entity within the unstructured data as a function of each MLM;
   wherein generating the at least one annotation as a function of the unstructured data using each MLM of the plurality of MLMs further comprises:
      comparing, by the at least a processor, the annotations generated using the plurality of MLMs;
      identifying, by the at least a processor, at least one agreement between the plurality of MLMs as a function of the comparison of the annotations;
      determining, by the at least a processor, at least one validated annotation from the annotation based on the at least one agreement; and
      generating, by the at least a processor, the at least one annotation as a function of the at least one validated annotation;
   wherein generating the at least one annotation comprises:
      identifying, by the at least a processor, at least one disagreement between the plurality of MLMs as a function of the comparison of the annotations; and
      filtering, by the at least a processor, at least one inconclusive annotation from the annotations based on the at least one disagreement;
   wherein generating the at least one annotation further comprises:
      requesting, by the at least a processor, a user input on a user interface displayed on a physical display for the at least one inconclusive annotation from a user; and
      modifying, by the at least a processor, the at least one inconclusive annotation as a function of the user input.

8. The method of claim 7, wherein the plurality of MLMs comprises a first MLM, a second MLM, and a third MLM.

9. The method of claim 7, wherein the plurality of MLMs are each trained using a fine-tuning learning technique.

10. The method of claim 7, wherein determining the at least one validated annotation from the annotation comprises determining the at least one validated annotation as a function of a voting mechanism.

11. The method of claim 7, further comprising training, by the at least a processor, a discriminative model using the structured data.

12. The method of claim 7, further comprising storing, by the at least a processor, the structured data in a database.

* * * * *